March 4, 1947.  A. H. FORGAR  2,416,743
GLASS PRESS MOLD TURNING DEVICE
Filed Jan. 31, 1945
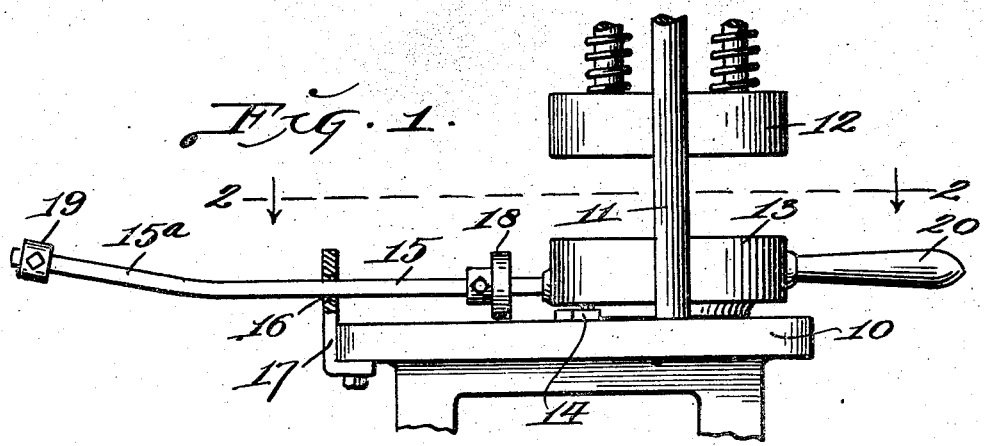
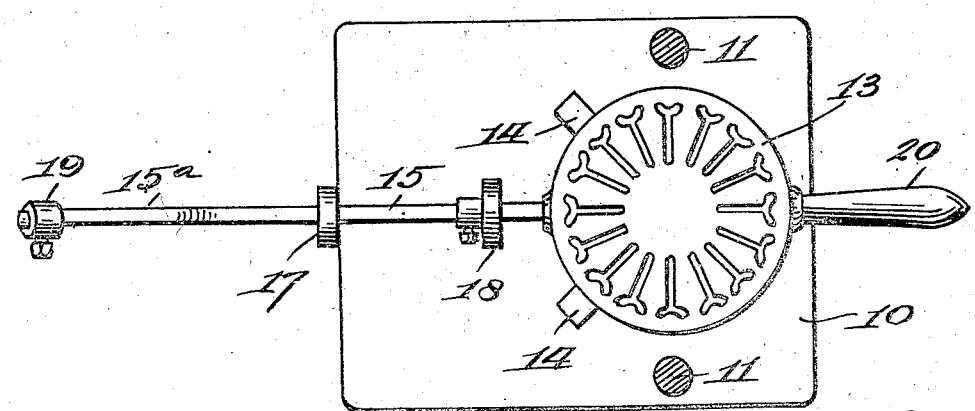
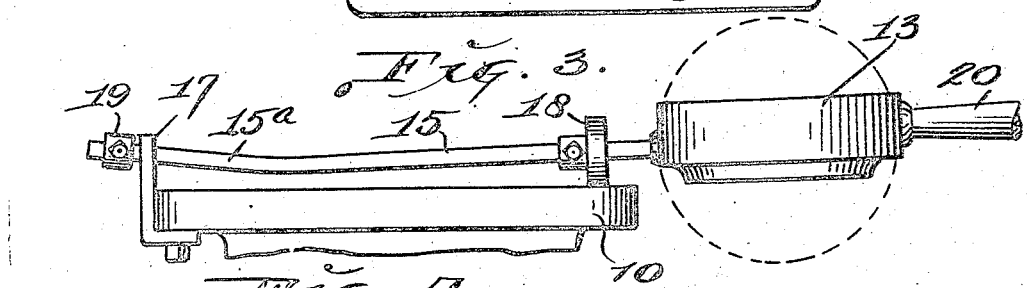
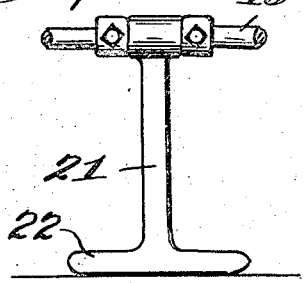
INVENTOR.
ALBERT H. FORGAR
BY
Martin P. Smith
ATTY.

Patented Mar. 4, 1947

2,416,743

UNITED STATES PATENT OFFICE 2,416,743

GLASS PRESS MOLD TURNING DEVICE

Albert H. Forgar, Los Angeles, Calif.

Application January 31, 1945, Serial No. 575,476

5 Claims. (Cl. 49—41)

My invention relates generally to glass presses and their molds and has for its principal object, to provide simple, practical and convenient means for manipulating the mold for the purpose of accomplishing, with comparatively little effort on the part of the operator, the turning out or removal and discharge of the molded ware or articles, from the said cavities.

On certain types of glass presses having large and heavy molds, the manual manipulation of the latter in the turning out of the molded ware involves considerable arduous labor and effort on the part of the operator and it is one of the prime objects of my invention, to provide means for minimizing such tiresome operations and at the same time, increasing production of the molded products.

With the foregoing and other objects in view, my invention consists in certain novel features of construction and arrangement of parts, which will be hereinafter more fully described and claimed and illustrated in the accompanying drawings in which:

Fig. 1 is a side elevation of a glass press and showing my improved mold manipulation means applied thereto.

Fig. 2 is a horizontal section taken on the line 2—2 of Fig. 1.

Fig. 3 is a side elevation similar to Fig. 1 and showing the lower part of the mold drawn forwardly into position to be inverted so as to turn out the ware.

Fig. 4 is an elevational view of a modified form of a part of the mold supporting means.

Referring by numerals to the accompanying drawings, which illustrate a practical embodiment of my invention, 10 designates the bed plate of a conventional glass press, 11 spaced uprights which support and guide the vertically movable upper part 12 of the mold, 13 the lower part of the mold which is movable on bed plate 10 and which, when positioned against guides and stops 14 on said bed plate, occupies a position directly beneath the upper mold part 12.

Usually these guides and stops are adjustable in order that the lower mold member 13 may be accurately centered beneath the upper member.

Secured to and projecting from lower mold member 13 is a member, preferably a rod 15 which functions as a guide for said mold member and at the rear of bed plate 10, said guide passes through an aperture 16 formed in a bearing 17, the latter being fixed to said bed plate.

Secured to guide 15 a short distance from said member 13 is a small disc 18, which during the turning out operation, functions as a wheel to travel over the upper face of the bed plate and the diameter of this disc is such that its periphery or tread just clears the surface of the bed plate when lower mold member 13 is resting thereon (see Fig 1).

The rear portion such as 15a of guide 15, is preferably, although not necessarily, inclined upwardly a few degrees and secured on the rear end of said inclined portion is a collar 19, which serves as a stop to limit the forward movement of the guide through bearing 17.

Secured to and projecting outwardly from the front side of mold member 13 is a handle 20.

During the glass pressing function, mold member 13 is centered on bed plate 10 beneath member 12 and the latter moves downward onto the lower member thus pressing molten glass into the mold cavities. Following this operation, mold member 12 moves upwardly and to effect a turning out of the pressed ware from the cavities in lower member 13, handle 20 is engaged and lower member 13 is drawn outward to a position in front and clear of bed plate 10 and as said member clears the front edge of the bed plate, disc lowers a fraction of an inch until it contacts with and rests upon the surface of said bed plate, thus supporting the lower mold member without effort on the part of the operator.

By means of handle 20, lower member 13 is turned upside down, during which movement, disc 18 functions as a wheel to travel laterally a short distance on bed plate 10, thus serving as a rolling support and the bottom of the inverted mold member is now tapped in the usual manner to loosen the ware from the mold cavities, which ware drops into a suitable receptacle.

When the lower mold member is drawn outwardly to turn out the ware as just described, the inclined rear portion 15a of the guide 15 bearing in bearing 17, slightly elevates the forward end of said guide and mold member 13 (disc 18 serving as a fulcrum), so that when said member 13 is turned right side up, its underface occupies a plane slightly above the upperface of the bed plate thus enabling said member to be moved rearwardly onto said plate, without the arduous effort of bodily lifting said member.

Subsequent to the operation just described, a mass of molten glass is placed in the cavities of lower member 13 and same is now slid with comparatively little effort rearwardly on the bed plate, to its centered position to receive the upper mold member for the subsequent pressing operation.

For the high molds, where a disc such as 18 cannot be conveniently used, a standard such as 21 is journalled on guide 15 and the lower end of said standard carrying a runner or shoe 22, which slides readily over the surface of the bed plate.

Thus it will be seen that I have provided a glass press mold turning out device which is simple in structure, inexpensive of manufacture and very effective in performing the functions for which it is intended.

It will be understood that minor changes in the size, form and construction of the various parts of my improved glass press mold turning out device may be made and substituted for those herein shown and described without departing from the spirit of the invention, the scope of which is set forth in the appended claims.

I claim as my invention:

1. The combination with a glass press, its bed plate and mold comprising an upper and a lower part, of a guide member secured to and extending rearwardly from the lower part of the mold, a bearing secured to said bed plate for the rear portion of said guide member and a bed plate engaging support carried by said guide member, and located between said bearing and the lower part of the mold.

2. The combination as set forth in claim 1 including a stop on the rear end of said guide member.

3. The combination as set forth in claim 1 and the rear portion of which guide member is inclined upwardly.

4. The combination with a glass press, its bed plate and mold comprising an upper and a lower part, of a guide member secured to and extending rearwardly from the lower part of the mold, a bearing in which the rear portion of said guide member is mounted for sliding and rotary movement which bearing is secured to said bed plate and a disc mounted on said guide member, between said bearing and said lower mold part.

5. The combination as set forth in claim 4 including means mounted on the rear portion of said guide member for limiting the forward movement of said lower mold part and guide member.

ALBERT H. FORGAR.

REFERENCES CITED

The following references are of record in the file of this patent:

UNITED STATES PATENTS

| Number | Name | Date |
| --- | --- | --- |
| 91,119 | Haines | June 8, 1869 |
| 212,850 | Hemingray | Mar. 4, 1879 |
| 519,113 | Grebe | May 1, 1894 |
| 696,254 | Nash | Mar. 25, 1902 |
| 164,517 | Brooke | June 15, 1875 |